United States Patent [19]
Ishima et al.

[11] Patent Number: 5,984,041
[45] Date of Patent: Nov. 16, 1999

[54] HYDRAULIC BRAKE DEVICE

[75] Inventors: Kenta Ishima; Mikio Minowa; Mitsuhiro Nakagawa; Nobuyuki Takeda; Tadashi Shoda, all of Fujisawa, Japan

[73] Assignee: Isuzu Motors Limited, Tokyo, Japan

[21] Appl. No.: 08/998,022

[22] Filed: Dec. 24, 1997

[30] Foreign Application Priority Data

Dec. 27, 1996 [JP] Japan ................................. 8-350665
Jan. 9, 1997 [JP] Japan ................................. 9-002105

[51] Int. Cl.[6] ................. B62D 33/08; B62D 33/067; G05G 1/14
[52] U.S. Cl. ................. 180/328; 180/89.14; 74/512
[58] Field of Search ................. 180/89.12, 89.13, 180/89.14, 89.15, 89.16, 89.18, 326, 327, 328; 74/512, 478; 303/71

[56] References Cited

U.S. PATENT DOCUMENTS

| | | | |
|---|---|---|---|
| 2,811,868 | 11/1957 | Ayers, Jr. et al. | 74/512 |
| 3,476,202 | 11/1969 | Dudley | 180/89.14 |
| 3,541,880 | 11/1970 | Dudley | 180/89.14 |
| 3,838,624 | 10/1974 | Mita et al. | 91/1 |
| 4,270,646 | 6/1981 | Norcross | 192/111 R |
| 4,318,571 | 3/1982 | Vize | 303/71 |
| 5,590,733 | 1/1997 | Ljungholm et al. | 180/89.14 |

*Primary Examiner*—Christopher P. Ellis
*Assistant Examiner*—Christopher A Bottorff
*Attorney, Agent, or Firm*—Antonelli, Terry, Stout & Kraus

[57] ABSTRACT

The quantity that a brake pedal 5 disposed inside a cab is stepped on is communicated to a link 10a through rods 9a and 9b, and rotates a shaft 23. The rotation of the shaft is communicated through a link 10b to a rod 9c, and a push rod 27 of a hydraulic booster 2 is pushed in by a link 10c. An adjuster 15 connecting the rod 9a and the rod 9b supports the rod 9a enabling a slide movement in the axial direction, and at the same time forces both rods in the direction to extend away from each other by a spring disposed inside. The relative displacement of the chassis frame and the cab is absorbed by the adjuster.

4 Claims, 5 Drawing Sheets

HYDRAULIC BRAKE DEVICE

TECHNICAL FIELD OF THE INVENTION

The present invention relates to a hydraulic brake device comprising a hydraulic booster and, more particularly, to a device for transmitting the operating force of the brake pedal to the booster in a hydraulic brake device.

BACKGROUND OF THE INVENTION

A hydraulic brake device for transmitting the operated quantity of the brake pedal to the spool of the hydraulic device through a link to increase the breaking power is disclosed in, for example, Japanese Patent Laid-Open No. H5-124492.

A hydraulic booster generally has large weight, and a booster of a bonnet-type truck is positioned inside the engine room. The engine room can endure the weight of the booster since a chassis frame is positioned underneath the floor. Therefore, the booster is operated directly via a push rod from the pedal inside the cab room. In a forward control vehicle, the booster can't be mounted underneath the floor of the cab since the floor can't endure such weight. Considering the hydraulic piping from the hydraulic booster to the brake of each wheel, it is preferable that the hydraulic booster of a forward control vehicle be placed on the chassis frame of the vehicle.

In a forward control vehicle having a cab positioned on the chassis frame of the vehicle, the cab is mounted on the frame with a tilt structure so that the cab can tilt against the frame. Further, the cab is mounted on the frame through a suspension.

The brake pedal is positioned inside the cab, so a device for transmitting the operated quantity of the brake pedal accurately to the spool of the hydraulic booster is necessary.

In a forward control vehicle, the movement of the cab against the frame differs from the movement of the cab against the chassis at the time of driving, so the cab suspension is displaced relatively, and the cab may be tilted by the tilt structure.

The present invention provides a hydraulic brake device to be applied to a forward control vehicle described above comprising a device having a means for absorbing the relative displacement between the cab and the chassis.

SUMMARY OF THE INVENTION

The hydraulic brake device of the present invention comprises a brake pedal positioned inside the cab of a forward control vehicle, a frame attached to the floor to support the cab, a cab mount bracket fixed to the lower surface of the front end of said frame, a chassis mount bracket for connecting the cab and the chassis mounted on the upper surface of the chassis opposing the cab mount bracket, a shaft mounted rotatably on a collar penetrating said cab mount bracket, a first and second links fixed to both ends of the shaft, a chassis frame of the vehicle, a hydraulic brake booster fixed to the front end portion of said chassis frame via a fixing bracket, an adjuster provided between a first and second rod for connecting said brake pedal and said first link, and a third rod connected to said hydraulic booster through said second link at one end and a third link at the other end.

Said adjuster comprises a body fixed to the second rod, a means for supporting the first rod slidably in the axis direction to the body, and a spring for forcing each of the first rod and the second rod in the extending direction, wherein the adjuster absorbs the relative movement of the cab and the chassis when the brake pedal and the booster is connected by the link.

DETAILED DESCRIPTION

Figure 1:
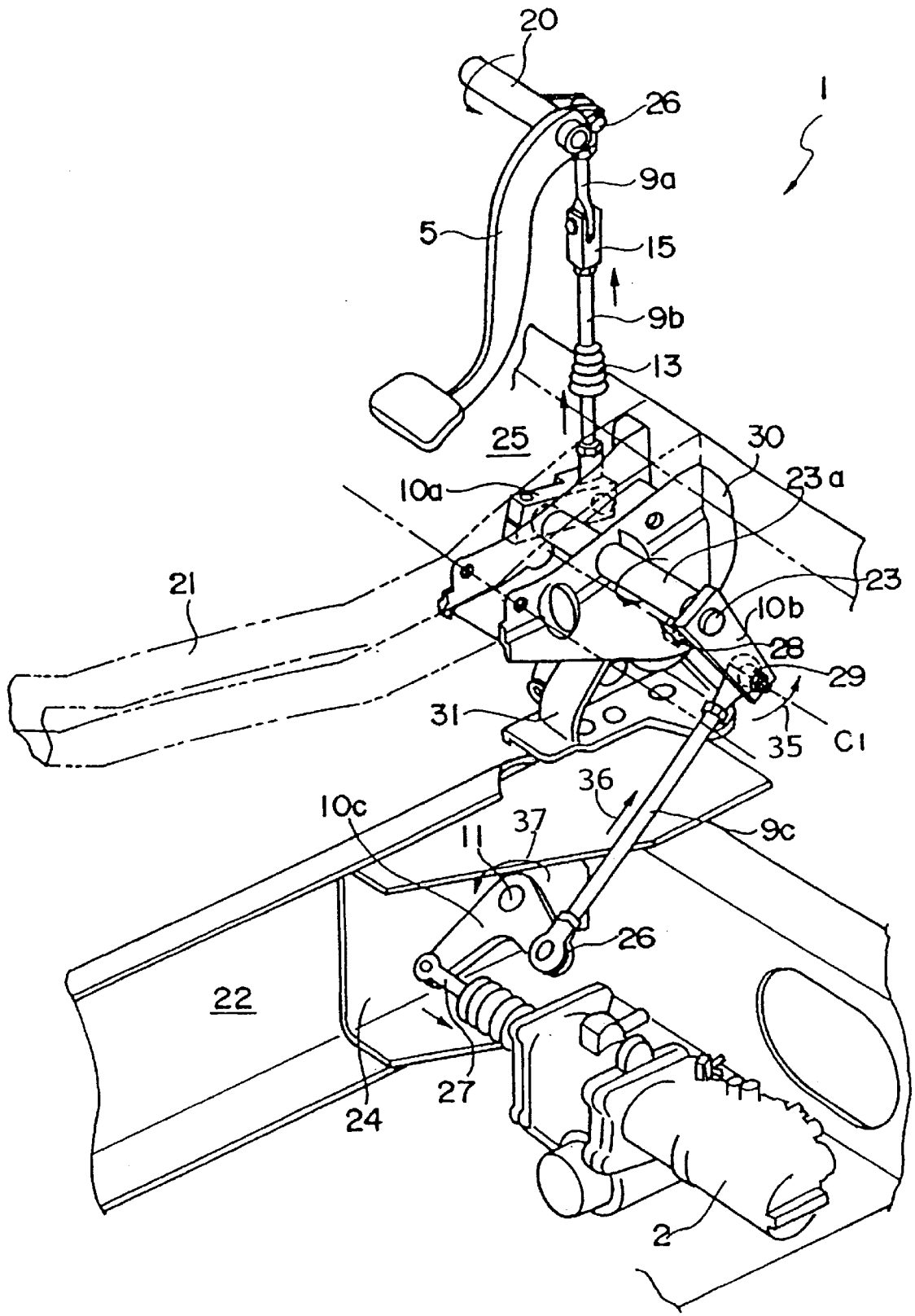
FIG. 1 is a schematic view showing the whole structure of the hydraulic brake device of the present invention.
Figure 2:
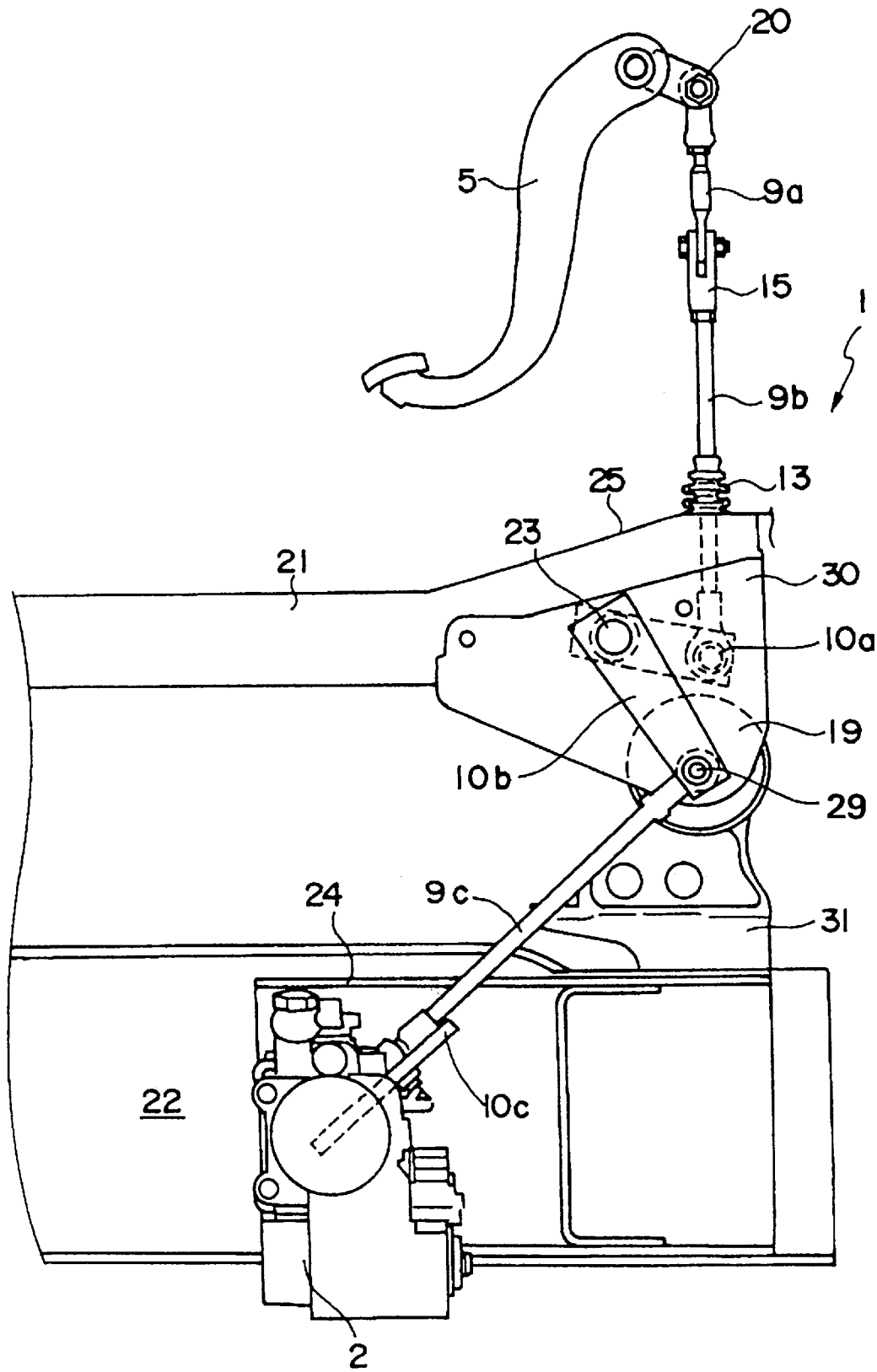
FIG. 2 is a side view of the hydraulic brake device of the present invention.
Figure 3:
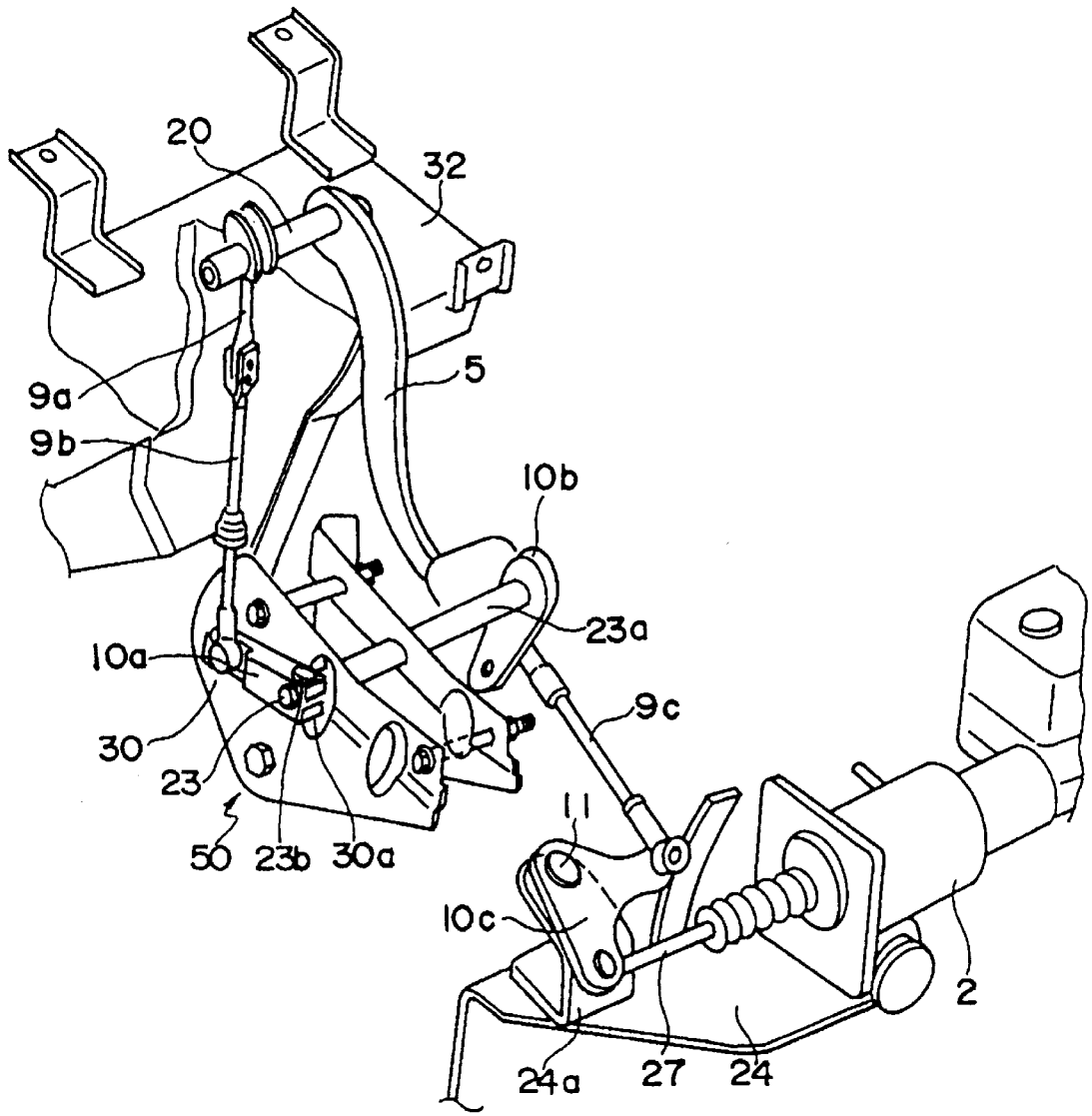
FIG. 3 is a schematic view of the main portion of the hydraulic brake device of the present invention.

FIG. 1 is a schematic view showing the whole structure of the hydraulic brake device of the present invention, FIG. 2 is a side view, and FIG. 3 is a schematic view of the main portion.

The hydraulic brake device shown as a whole by the reference number 1 comprises a hydraulic booster 2 fixed to a chassis frame 22 of the vehicle through a bracket 24. The hydraulic booster 2 comprises a function for providing a certain hydraulic oil to the break device of the vehicle by a known structure of pushing a push rod 27 connected to a spool inside a cylinder.

A chassis front mount bracket 31 is fixed to the chassis frame 22, and an under frame 21 of the cab is supported on the shaft through a cab front mount bracket 30 so that the under frame can tilt with the shaft 28 at the center of tilt. A bush 19 and the like also serving as the suspension is positioned between the shaft 28 and the chassis front mount bracket 31.

On the driver's seat of the cab mounted on the under frame 21, a brake pedal 5 is mounted so as to be able to move along a center positioned at the axis line of a collar 20.

The quantity that the brake pedal is stepped on is converted to a quantity of pulling a first rod 9a through a ball joint 26, and further transmitted.

The first rod 9a is connected to a second rod 9b through an adjustment device 5, and the second rod 9b extends to the lower portion of the cab penetrating through a floor 25 of the cab.

A grommet 13 is positioned on the portion of the cab floor penetrated by the second rod 9b in order to seal the opening.

The cab front mount bracket 30 fixed to the under frame 21 of the cab has a shaft 23 supported rotatably inside a welded collar 23a which penetrates the bracket 30 in the horizontal direction.

On the both end portions of the shaft 23 are mounted a first link 10a and a second link 10b. The first link 10a is connected to the lower end portion of the second rod 9b, the second link 10b is connected to one end of a third rod 9c through a universal joint 29, and the rotation axis $C_1$ of the third rod 9c to the universal joint 29 is set so as to correspond with the axis line of the shaft 28 at the center of tilt.

The other end of the third rod 9c is connected to one end of a third link 10c through a ball joint 26. The third link 10c is supported rotatably by a pin 11 against a bracket 24a fixed to the mounting bracket of the hydraulic booster.

The other end of the third link 10c is connected to a push rod 27 which is provided as a unit with a spool of the hydraulic booster 2.

The hydraulic brake device of the present invention is formed as described above. Therefore, when the brake pedal 5 inside the cab is stepped on, the first rod 9a and the second rod 9b will be pulled in the upper direction according to the quantity that the brake was moved, rotating the first link 10a and the second link 10b in the direction shown by the arrow in FIG. 1. By the rotation of the links 10a and 10b, the third rod 9c will be pulled in the direction of the arrow of FIG. 1, rotating the third link 10c in the direction of the arrow.

By the rotation of the third link 10c, the push rod will be pushed in, and the hydraulic power corresponding to the quantity that the push rod was inserted will operate against the hydraulic cylinder of the wheel, providing breaking power.

The hydraulic brake device of the present invention connects the brake pedal and the push rod of the hydraulic booster by a transmission device comprising rods and links, so the intention of the driver will be communicated to the hydraulic booster exactly, providing accurate breaking power.

In the present hydraulic brake device, the cab front mount bracket 30, the collar 23a penetrated through a hole 30a of the cab front mount bracket and welded to the position, a shaft 23 supported rotatably on the collar 23a, and the first and second links 10a and 10b mounted on both ends of the shaft 23 are preformed as a subassembly, constituting a unit. The link 10a may be fixed to the end portion of the shaft 23 by use of a serration, for example, so that the displacement could be adjusted, and the link 10a and the shaft 23 is fixed by a bolt 23b. The other link 10b may be welded and the like onto the shaft 23.

A cab front mount unit 50 constituted as above is fixed to a frame 21, and it is assembled by connecting the rod to both links. By preforming the members including the two links as one unit, the number of steps necessary for the assembly of the device could be reduced.

Further, the adjustment of the rotation axis $C_1$ of the universal joint connecting the second link 10b and the third rod 9c with the axis line of the shaft 28 at the center of tilt becomes easy.

Figure 4:
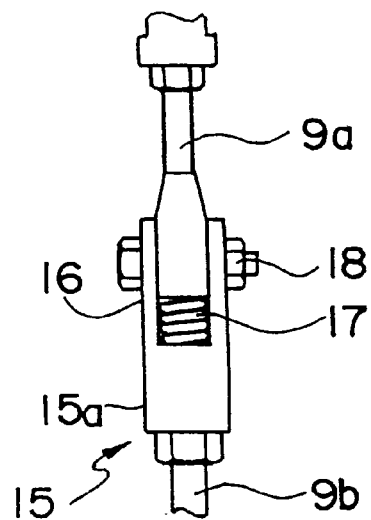
FIG. 4 is a side view of the adjuster.
Figure 5:
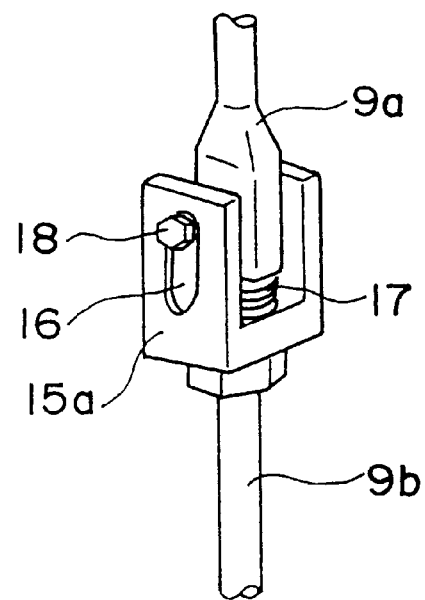
FIG. 5 is a schematic view of the adjuster.
Figure 6:
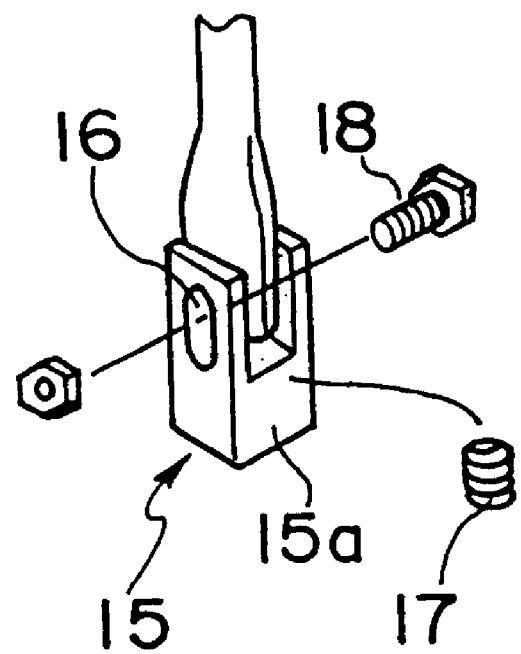
FIG. 6 is a component view of the adjuster.

FIG. 4 is a side view of an adjuster 15, FIG. 5 is a schematic view, and FIG. 6 is a view of the components.

An adjuster 15 shown as a whole by the reference number 15 has an adjuster body 15a connected to the second rod 9b. The adjuster body 15a comprises a fork member for receiving the end portion of the first rod 9a, and a long hole 16 is formed on this fork member. The adjuster body 15a and the end portion of the first rod 9a is connected by a bolt and nut 18. A coil spring 17 is inserted between the bottom portion of the fork member of the adjuster body 15a and the first rod 9a.

When the break pedal is stepped in, the first rod 9a is pulled up in the manner described above, and this movement is transmitted to the adjuster body 15a and the second rod 9b through the bolt and nut 18.

When compression force operates between the first rod 9a and the second rod 9b by the relative movement between the chassis frame and the cab frame, the coil spring 17 will be compressed, absorbing the movement. As a result, the roving movement of the brake pedal and the push rod of the booster caused by the roving movement of the first rod 9a and the second rod 9b will be prevented.

In order to achieve this function, a spring with small spring modulus is used as the coil spring 17.

According to the present invention, the shaft 18 moves in the space of the long hole 16 of the adjuster (the adjuster moves to the upper direction) with the rod keeping its position against the input from the cab suspension (the pushing movement of the vibration from the chassis). At this time, the input will be absorbed by the spring, and input will not be transmitted to the rod 9a. By the present input absorption structure, the false operation of the break will be prevented when driving the vehicle.

Further, the spring always pushes up the shaft 18 against the input from the cab side (upper side), so the false operation of the break will not occur.

We claim:
1. A hydraulic brake device comprising:
   a brake pedal disposed inside a cab of a forward control vehicle with a suspension;
   a frame attached to the floor to support said cab;
   a cab mount bracket fixed to the lower surface of the front end portion of said frame;
   a shaft rotatably supported inside a collar penetrating said cab mount bracket;
   a first link and a second link fixed to each of the end portions of said shaft;
   a chassis frame of the vehicle;
   a hydraulic brake booster fixed via a mounting bracket thereof to the front end portion of said chassis frame;
   a first rod and a second rod for connecting said brake pedal and said first link; and
   a third rod being connected to the hydraulic booster by said second link at one end and a third link at the other end;
   wherein the brake is operated by communicating a pedal effort applied to the brake pedal through each said rods, links and said shaft connecting said cab and said chassis to said hydraulic booster.

2. The hydraulic brake device of claim 1, wherein said cab mount bracket, said collar provided in correspondence with openings formed on said cab mount bracket, said shaft rotatably supported inside said collar and the first and second links fixed to both ends of said shaft are provided as a unit.

3. The hydraulic brake device of claim 1, wherein said cab mount bracket is provided when connecting said brake pedal and said hydraulic booster with said links, and the connecting point of said second link and said third rod is corresponded with the center for tilting said cab.

4. A hydraulic brake device comprising:
   a brake pedal disposed inside a cab of a forward control vehicle with a cab suspension;
   a frame attached to the floor to support said cab;
   a cab mount bracket fixed to the lower surface of the front end portion of said frame;
   a cab mount bracket mounted on the upper surface of a chassis frame of the vehicle relative to said cab mount bracket attached to said floor for connecting the cab and the chassis;
   a shaft rotatably supported inside a collar penetrating said cab mount bracket;
   a first link and a second link fixed to each of the end portions of said shaft;
   a hydraulic brake booster fixed by a mounting bracket thereof to the front end portion of said chassis frame;
   an adjuster provided between a first rod and a second rod connecting said break pedal and a first link; and
   a third rod being connected to said second link at one end and to the hydraulic booster through a third link at the other end;

wherein said adjuster comprises a body fixed to said second rod, a means for supporting said first rod to said body enabling a slide movement in the axial direction, and a spring for forcing said first rod and said second rod to extend away from each other, absorbing the relative movement of said cab and said chassis when said break pedal and said booster is connected by said links and rods.

* * * * *